(12) United States Patent
Bevins et al.

(10) Patent No.: US 10,870,571 B2
(45) Date of Patent: Dec. 22, 2020

(54) FUEL STORAGE AND SUPPLY ARRANGEMENT HAVING FUEL CONDITIONING AND FILTRATION SYSTEM

(71) Applicant: Veeder-Root Company, Simsbury, CT (US)

(72) Inventors: James T. Bevins, South Windsor, CT (US); Thomas Scott Menke, Seattle, WA (US); Diane Marie Sinosky, Enfield, CT (US); Kent Deloy Reid, Canton, CT (US); Nicholas Robert Peterson, Ellington, CT (US); Kyle Stephen Gibson, Westfield, MA (US)

(73) Assignee: Veeder-Root Company, Simsbury, CT (US)

( * ) Notice: Subject to any disclaimer, the term of this patent is extended or adjusted under 35 U.S.C. 154(b) by 0 days.

(21) Appl. No.: 16/153,541

(22) Filed: Oct. 5, 2018

(65) Prior Publication Data

US 2020/0102206 A1    Apr. 2, 2020

Related U.S. Application Data

(63) Continuation-in-part of application No. 16/149,665, filed on Oct. 2, 2018.

(51) Int. Cl.
  *B67D 7/76*    (2010.01)
  *B67D 7/78*    (2010.01)
  (Continued)

(52) U.S. Cl.
  CPC ............... *B67D 7/766* (2013.01); *B67D 7/32* (2013.01); *B67D 7/36* (2013.01); *B67D 7/78* (2013.01); *B67D 2210/0001* (2013.01)

(58) Field of Classification Search
  CPC ............. B67D 7/76; B67D 7/766; B67D 7/78
  (Continued)

(56) References Cited

U.S. PATENT DOCUMENTS

| 1,218,623 A | 3/1917 | Brillhart |
| 2,442,379 A | 6/1948 | Samiran |

(Continued)

FOREIGN PATENT DOCUMENTS

| BR | PI1006089 A2 | 11/2016 |
| WO | 2012172286 A1 | 12/2012 |
| WO | 2016066236 A1 | 5/2016 |

OTHER PUBLICATIONS

Original and Translation of WO 2017194588 A1; Cloutier, Philippe; Nov. 16, 2017.*

(Continued)

*Primary Examiner* — Paul J Gray
(74) *Attorney, Agent, or Firm* — Nelson Mullins Riley & Scarborough, LLP (57) ABSTRACT

A fuel storage and supply arrangement serves as a source of fuel to be dispensed via at least one fuel dispenser in a fuel dispensing environment. The arrangement comprises a storage tank for containing a quantity of the fuel, fuel piping configured to convey fuel from the fuel storage tank to a fuel dispenser, and a fuel conditioning and filtration assembly having an inlet in fluid communication with the fuel piping and an outlet in fluid communication with the fuel storage tank to return the fuel. A fuel conditioning and filtration element is interposed between the inlet and the outlet, the fuel conditioning and filtration element being configured to remove water from the fuel passing through the filter element. A flow valve allows and prevents flow of fuel through the filter element. Processing circuitry is operative to control the flow valve based on predetermined criteria.

16 Claims, 8 Drawing Sheets

(51) Int. Cl.
*B67D 7/32* (2010.01)
*B67D 7/36* (2010.01)

(58) Field of Classification Search
USPC ..... 141/11, 286; 137/592; 210/172.1, 172.2; 366/173.1, 173.2
See application file for complete search history.

(56) References Cited

U.S. PATENT DOCUMENTS

| | | | |
|---|---|---|---|
| 4,500,425 A | 2/1985 | Thornton et al. | |
| 4,502,954 A | 3/1985 | Druffel | |
| 4,784,751 A | 11/1988 | McGehee | |
| 4,799,504 A | 1/1989 | Scragg et al. | |
| 4,820,053 A * | 4/1989 | Rivers | B01F 3/1214 366/137 |
| 5,053,120 A | 10/1991 | Mollmann | |
| 5,122,264 A | 6/1992 | Mohr et al. | |
| 5,192,430 A | 3/1993 | Mohr | |
| 5,368,001 A | 11/1994 | Roche | |
| 5,534,161 A | 7/1996 | Tarr et al. | |
| 5,544,518 A | 8/1996 | Hart et al. | |
| 6,042,722 A | 3/2000 | Lenz | |
| 6,058,968 A | 5/2000 | Carter | |
| 6,371,087 B1 | 4/2002 | Condran et al. | |
| 6,596,174 B1 | 7/2003 | Marcus | |
| 7,150,269 B2 | 12/2006 | de Monts de Savasse et al. | |
| 7,655,140 B2 | 2/2010 | Weiczorek et al. | |
| 7,726,336 B2 | 6/2010 | Dolson | |
| 7,883,627 B1 | 2/2011 | Barrett | |
| 8,366,312 B1 | 2/2013 | Valdez et al. | |
| 8,486,261 B2 | 7/2013 | Buccholz et al. | |
| 8,636,482 B2 | 1/2014 | Dolson | |
| 2004/0050804 A1 | 3/2004 | Dittmann et al. | |
| 2005/0121374 A1 | 6/2005 | Girondi | |
| 2006/0207924 A1 | 9/2006 | De La Azuela et al. | |
| 2006/0231501 A1 | 10/2006 | Sundeng | |
| 2008/0230146 A1 | 9/2008 | Kastner et al. | |
| 2010/0096039 A1 | 4/2010 | Midttun | |
| 2012/0042855 A1 | 2/2012 | Vogley et al. | |
| 2012/0042961 A1 | 2/2012 | Anderson et al. | |
| 2012/0192480 A1 | 8/2012 | Barrett | |
| 2012/0261437 A1 | 10/2012 | Sabo et al. | |
| 2014/0224215 A1 | 8/2014 | Lehman et al. | |
| 2016/0039656 A1 | 2/2016 | Walsh et al. | |
| 2016/0059161 A1 | 3/2016 | Heine et al. | |
| 2017/0173505 A1 * | 6/2017 | Dhingra | F01M 11/03 |
| 2018/0257925 A1 * | 9/2018 | Schultz | B67D 7/68 |
| 2020/0017351 A1 | 1/2020 | Schultz et al. | |

OTHER PUBLICATIONS

Co-pending U.S. Appl. No. 16/530,579, filed Aug. 2, 2019, all enclosed pages cited.

International Search Report and Written Opinion dated Feb. 6, 2020 in corresponding international patent application serial No. PCT/US2019/054091, all enclosed pages cited.

Simplex "SmartFilter Series: Intelligent Filtration and Maintenance Systems for Fuel Oil" Spec Sheet, copyright 2018, Simplex, Inc., all enclosed pages cited.

"Simplex SmartFilter Manual, Oct. 2010," owner's manual, copyright 2010, Simplex, Inc., all enclosed pages cited.

"Compact SmartFilter Plumbing" schematic, dated May 30, 2012, copyright 2012, Simplex, Inc., all enclosed pages cited.

* cited by examiner

FUEL STORAGE AND SUPPLY ARRANGEMENT HAVING FUEL CONDITIONING AND FILTRATION SYSTEM

FIELD OF THE INVENTION

The present invention relates generally to fuel dispensing environments having one or more fuel storage tanks. More particularly, the present invention relates to a fuel dispensing environment in which one or more of the storage tanks are equipped with a fuel conditioning and filtration assembly.

BACKGROUND

Fuel dispensing environments, such as retail fueling stations and fuel depots, typically store fuel in fuel tanks, such as an underground storage tank (UST). In some instances, small amounts of water or debris may be introduced into the storage tank, which can degrade the fuel. For example, during periods of rain, water typically flows over pavement in the forecourt region of a service station into a storm drain. Occasionally, some of this water may make its way into an underground storage tank. Generally, water and debris are denser than the fuel stored in the tank and thus settle near the bottom of the tank. Water and fuel are immiscible, which causes a water layer to form below the fuel creating a fuel/water interface layer in the storage tank. The level of the fuel/water interface is typically monitored to ensure that water is not introduced into the inlet through which fuel is drawn from the tanks.

Moreover, the fuel/water interface in the storage tank may be susceptible to colonization and growth of microbial bacteria. For example, when storing ultra-low sulfur diesel (ULSD) fuel and/or ULSD blended with biodiesel fuel products, hydrocarbon utilizing microbes, e.g., "humbugs," may develop. These microbes can foul fuel delivery systems and ancillary components, including fuel dispenser components, metering devices, shear valves, and fuel nozzles. In addition to the direct effects of microbial growth, acid byproducts may be generated as a result of microbial digestion of food sources found in the ULSD and biodiesel fuels. These acids attack the metal surfaces in the fuel storage and delivery systems, which may lead to various problems.

Costly active measures can be taken to clean a contaminated tank, remove water and polish the fuel. This method requires shutting the tank down, which adds an additional cost of lost sales to the already high cost of cleaning. This process typically involves making multiple passes of the tank contents through progressively restrictive filter media and, ultimately, through a coalescing filter that removes any free water. These cleaning systems are large scale, typically truck mounted and are designed to clean up contamination as opposed to preventing contamination.

Many passive means are utilized to prevent or detect entrance of water into fuel tanks, such as vent line caps, inlet seals, tank inspections, and regular quality testing. However, even small amounts of water may cause serious degradation of the fuel tank and/or fuel. When water is detected, the entirety of the storage tank may need to be pumped in to setting tanks to have the water drained. After the water is drained, the fuel may then be reintroduced to the storage tank. Alternatively, the fuel tank may be allowed to settle and a suction hose is used to draw out water at the bottom of the fuel tank until the water layer is removed and only fuel flows through the suction hose.

SUMMARY OF CERTAIN ASPECTS

The present invention recognizes and addresses the foregoing considerations, and others, of prior art construction and methods. In this regard, certain exemplary and nonlimiting aspects of the present invention will now be described. These aspects are intended to provide some context for certain principles associated with the present invention, but, are not intended to be defining of the full scope of the present invention.

In an example embodiment of the present invention, a compact fuel conditioning and filtration assembly (FCFA) provides ongoing conditioning and filtering of fuel by removing water and debris from the bottom of a fuel storage tank, such as a UST. The removal of water and debris from the UST may directly improve the cleanliness and quality of the fuel dispensed therefrom. Further, the FCFA may limit or prevent colonization and growth of microbial bacteria that can develop at the fuel/water interface layer in the UST and prevent development of hydrocarbon utilizing microbes, e.g., "humbugs," that can foul fuel delivery systems and ancillary components. Additionally, since microbes are prevented from growing by removal of the water, the FCFA also reduces or eliminates the acid byproducts that result from the microbe's digestion of food sources (e.g., in ULSD and biodiesel fuels), thereby limiting or preventing acid damage to the metal surfaces of the fuel storage and delivery systems.

The FCFA may be fluidly coupled to a submersible turbine pump (STP) associated with a UST. The STP provides fuel flow through a manifold to one or more fuel dispensers either continuously or on demand. In this regard, the FCFA may be fluidly coupled to a test or bypass port of a packer manifold associated with the STP. As the fuel flows through the manifold, a portion of the fuel, which is relatively small compared to the fuel flow to the fuel dispenser, may be diverted through the test port to the FCFA and back to the UST after filtration. In an example embodiment, the FCFA may be disposed in an existing STP containment sump provided at the fuel dispensing site.

The FCFA may include a filter element configured to remove water from the fuel flowing therethrough. For example, the filter element may define a flow path, which allows or encourages water to precipitate to the bottom the filter element due to the density of water being greater than the density of the fuel. Additionally, debris may also precipitate out of the fuel toward the bottom of the filter element or be otherwise captured by filter media.

The FCFA may include one or more control valves to control the flow of fuel through the filter element and/or allow for draining of water and/or debris from the filter element to a storage reservoir. For example, a flow control valve may be disposed in the flow path of the fuel from the manifold through the filter element, and back to the UST. When the flow control valve is closed, fuel is prevented from flowing through the FCFA. At desired intervals and/or times, the flow control valve may be opened to allow flow of fuel through the FCFA. In this way, the operation of the FCFA may be limited to only the necessary duration to condition and filter the fuel and avoid periods when the fuel dispensers are more active. This may prevent or limit any impact to fueling operation caused by the diversion of a portion of the fuel through the FCFA. At the completion of one or more conditioning and filtering processes, e.g., when the flow control valve is closed, a drain valve disposed at or near the bottom of the filter housing may be opened to allow water and/or debris to flow into a storage reservoir. Collecting the water in this manner may extend the in-service period of the FCFA between maintenance operations. Moreover, collecting water in this manner proportionately reduces the amount of water available to mobilize microbial colonies in a manner that as the total surface area of the fuel/water interface is reduced, the microbial bacteria has less and less access to food sources in the fuel.

In some embodiments, the FCFA may include a return tube in fluid communication with the filter outlet. The return tube may be configured to cause turbulent flow at the bottom of the UST. The turbulent flow may cause water and debris near the bottom of the UST to mix with the fuel and therefore be more likely to enter, i.e., be drawn into, the inlet of the STP. In some embodiments, a diffuser (agitation manifold) defining a plurality of spaced apertures may be fluidly connected to the distal end of the return tube to cause turbulent flow over a wider area at the bottom of the UST.

One aspect of the present invention provides a fuel storage and supply arrangement serving as a source of fuel to be dispensed via at least one fuel dispenser in a fuel dispensing environment. The arrangement comprises a storage tank for containing a quantity of the fuel. A pump assembly is operative to draw the fuel from the storage tank into the fuel piping. A fuel supply line is configured to convey fuel from the fuel storage tank to the at least one fuel dispenser. A fuel conditioning and filtration assembly (FCFA) includes a housing having a housing inlet receiving the fuel under pressure created by the pump assembly and a housing outlet whereby the fuel entering the housing inlet exits the housing through the housing outlet. A filter element located within the housing is interposed in the flow path between the housing inlet and the housing outlet, the filter element being configured to remove water from the fuel passing through the filter element. The FCFA also includes a return tube receiving fuel from the outlet of the housing and having a discharge end disposed proximate to a bottom of the storage tank such that fuel flowing through the return tube causes turbulence in the fuel at the bottom of the storage tank. The flow of fuel to the housing inlet of the housing and through the discharge end of the return tube defines a fuel conditioning and filtration flow path. The FCFA also includes a flow control valve controlling the flow of fuel the through the fuel conditioning and filtration flow path.

Another aspect of the present invention provides a method of conditioning and filtering fuel including providing a fuel conditioning and filtration assembly comprising an inlet in fluid communication with fuel piping, wherein the fuel piping is configured to convey fuel from a fuel storage tank to one or more fuel dispensers. An outlet is in the fuel storage tank to return the fuel. A filter element is interposed along a flow path between the inlet and the outlet, wherein the filter element is configured to remove water from the fuel passing through the filter element. A flow control valve disposed in the flow path allows and prevents flow of fuel through the filter element. The method further includes determining, by processing circuitry, if pressure data associated with the fuel piping or a number of active fuel dispensers associated with the fuel storage tank satisfies a predetermined operation criteria. In addition, the method includes causing the flow control valve to open in response to the pressure data or the number of active fuel dispensers satisfying the predetermined operation criteria.

A still further aspect of the present invention provides a fuel conditioning and filtration assembly for use with a fuel storage tank providing fuel to at least one fuel dispenser via fuel piping fed with a fuel pump. The assembly comprises an inlet in fluid communication with the fuel piping. An outlet in the fuel storage tank returns the fuel. A filter interposed along a flow path between the inlet and the outlet is configured to remove water from the fuel passing through the filter. A flow control valve disposed in the flow path allows and prevents flow of fuel through the filter. A storage reservoir in fluid communication with the filter is configured to receive water drained from the filter. A conductivity sensor configured to measure conductivity of fluid within the filter is also provided. A drain valve is operatively disposed between the filter and the storage reservoir. Processing circuitry is operative to control the flow control valve based on predetermined operation criteria, the processing circuitry being further configured to receive conductivity data from the conductivity sensor, determine if water is present in the filter based on the conductivity data, and cause the drain valve to open if water is present allowing the water to drain from the filter to the storage reservoir.

Different systems and methods of the present invention utilize various combinations of the disclosed elements and method steps as supported by the overall disclosure herein. Thus, combinations of elements other than those discussed above may be claimed. Moreover, the accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1:
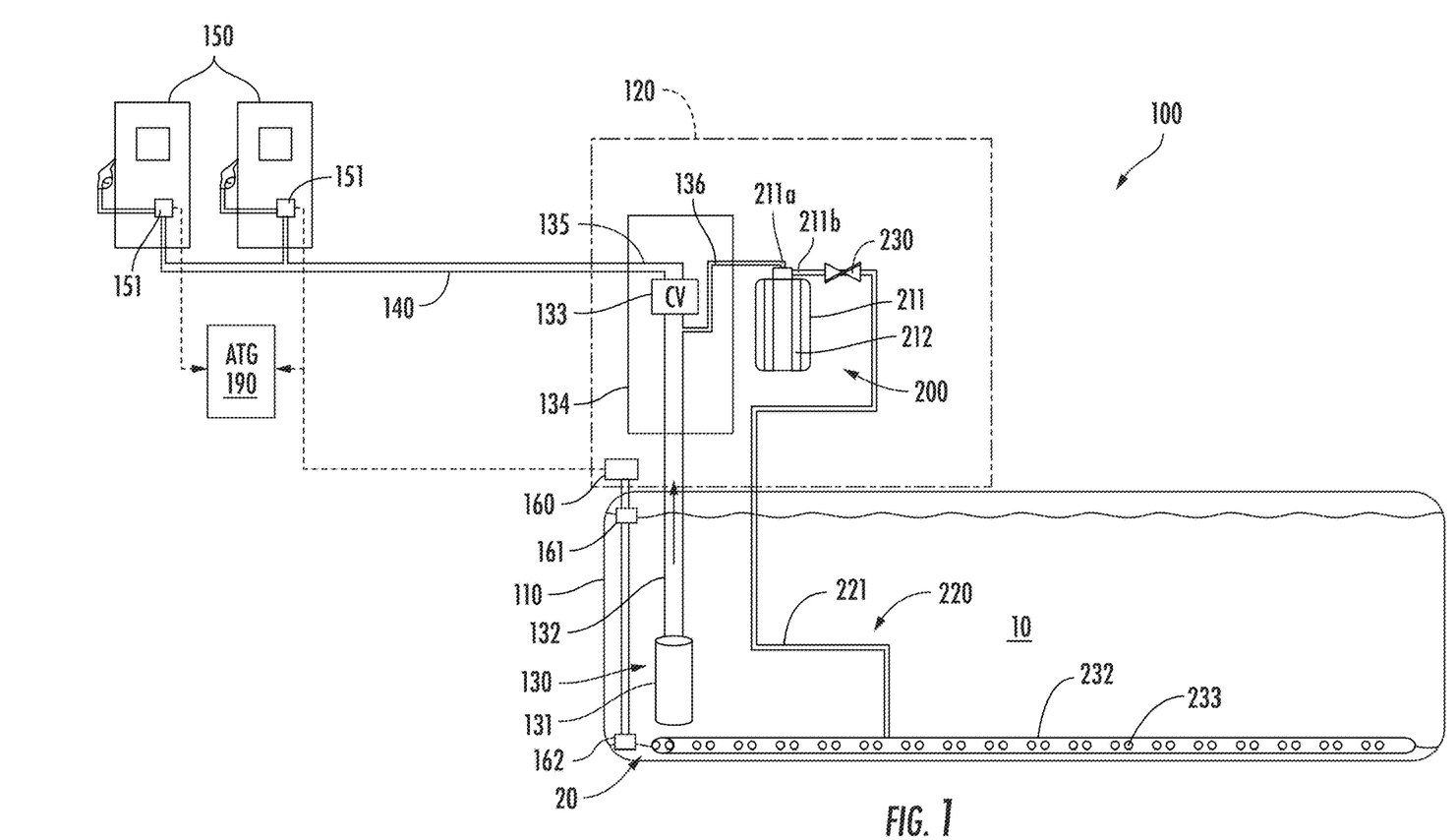
FIG. 1 is a diagrammatic representation of a fuel storage arrangement having a fuel conditioning and filtration assembly in accordance with an embodiment of the present invention.

FIG. 1 shows a fuel storage and supply system 100 with a fuel storage tank 110, such as an underground storage tank (UST), which stores a quantity of fuel 10 to be dispensed by fuel dispensers 150 in a fuel dispensing environment, such as a retail fueling station. A tank probe 160 extends into the storage tank 110, and has a fuel level sensor 161 for determining the level of fuel 10 in the storage tank 110 and a water level sensor 162 for determining the level of water 20 (and any contaminants therein) in the storage tank 110. A fuel pump, such as pump assembly 130 in the depicted embodiment, is associated with the storage tank 110 to pump the fuel 10 into fuel supply lines 140 for providing the fuel 10 to the one or more fuel dispensers 150. The path that the fuel 10 flows from the fuel pump to the fuel dispensers 150 is the dispenser flow path. The fuel dispensers 150 will have a dispenser fuel meter 151 to monitor the dispensing of fuel 10 by the respective fuel dispensers 150, and the fuel supply lines 140 may have one or more line pressure sensor(s) 141 (FIG. 2).

In embodiment illustrated, the pump assembly 130 includes a pump 131, such as a submersible turbine pump (STP), immersed in the fuel 10 at the lower end of a column 132. A packer manifold 134, defining a main fluid passageway and a number of ports, is located at the upper end of the column 132. The pump 131 sends the fuel 10, and sometimes water 20, from the tank 110 through the column 132 to the packer manifold 134 for access at the ports in the packer manifold 134. One of these ports, a pump outlet 135, supplies the fuel supply lines 140. A check valve 133 is located along the fluid passageway of the pump assembly 130 between the pump 131 and the pump assembly outlet 135, to retain fuel 10 under pressure in the fuel supply lines 140 when dispensing is not occurring and pump 131 is off. As one skilled in the art will appreciate, the packer manifold 134 will typically be located in a containment sump 120 defined below ground level when the storage tank 110 is a UST. One skilled in the art will understand and appreciate that, although illustrated as a submersible turbine pump, the pump 131 may be any configuration that draws fuel 10 from the storage tank 110. One example of pump 131 is a Red Jacket submersible turbine pump sold by Veeder-Root Company of Simsbury, Conn.

An automatic tank gauge (ATG) 190 manages the storage and supply of fuel 10 in the fuel storage and supply system 100. (Suitable ATGs include the TLS-450 ATG and the TLS-350 ATG sold by Veeder-Root Company.) The ATG 190 is electrically connected to the tank probe 160 to determine the level of fuel 10 and water 20 in the tank 110. The ATG 190 is also electrically connected to the fuel dispenser meters 151 in the fuel dispensers 150 (or otherwise to control circuitry for the fuel dispensers 150) and to the pump 131. The ATG 190 is also in electrical communication with the pressure sensor(s) 141.

Using information received from the fuel dispenser meters 151 and the pressure sensor 141, the ATG 190 can operate the pump 131 to satisfy the needs of the fuel dispensers 150. Moreover, the ATG 190 can use the line pressure sensor 141 to detect potential leaks in the fuel supply lines 140. Specifically, the ATG 190 can use the pump 131 to pressurize the fuel supply lines 140 during a dormant period when the fuel dispensers are not dispensing fuel 10. Once the fuel supply lines 140 are pressurized, the ATG 190 turns off the pump 131 and monitors the pressure in the supply lines with the line pressure sensor 141. Because of the check valve 133 in the pump assembly 130, the fuel supply lines 140 should maintain pressure for a predetermined period. If the ATG 190 determines that the pressure in the fuel supply lines 140 decreased too much or too quickly, there is an indication of a leak somewhere in the fuel storage and supply system 100, most likely in the fuel supply lines 140. The line pressure sensor 141 used to measure pressure in the fuel supply line 140 may be disposed at any point in the fuel supply line 140 between the pump 131 and a fuel dispenser 150, such as the outlet of the packer manifold 134.

In the present invention, a fuel conditioning and filtration assembly (FCFA) 200 is provided to improve the cleanliness and quality of the fuel 10 in the storage tank 110 by removing water 20 and any contaminants in the water. The FCFA 200 receives fuel 10, and water 20 when present, removed from the storage tank 110 by the pump assembly 130, and returns that fuel 10 to the storage tank after filtering out the contaminants and water 20.

Figure 2:
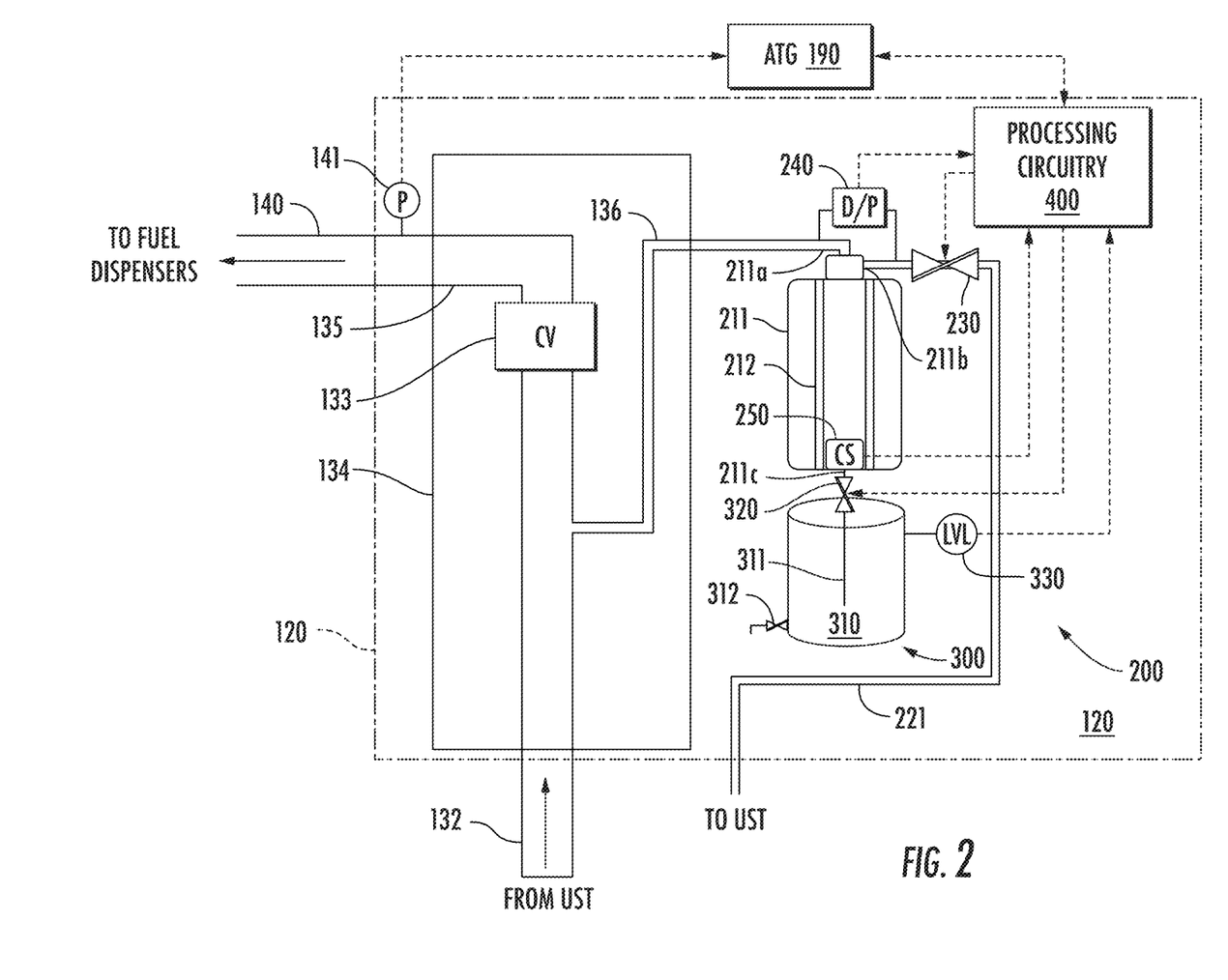
FIG. 2 is a detailed diagrammatic representation of certain aspects of a fuel conditioning and filtration assembly in accordance with an embodiment of the present invention.

In the embodiment illustrated in FIG. 2, FCFA 200 has a fuel conditioning and filtration element 212, or filter element, that separates the contaminants and water 20 from the fuel 10. Filter element 212 is located in a housing 211 having a housing inlet 211a and a housing outlet 211b. (Together, housing 211 and filter element 212 may be referred to herein as a filter.) Housing inlet 211a is in fluid communication with the dispenser flow path to receive at least some fuel drawn from tank 110 by the pump assembly 130. In this embodiment, for example, housing inlet 211a is in fluid communication with a port 136 provided in packer manifold 134. (The connection to port 136 can thus be considered an "inlet" for the overall FCFA.) Port 136 may be an existing port on packer manifold 134 otherwise provided, for example, for test purposes. Housing outlet 211b is in fluid communication with the storage tank 110. The housing 211 can also include a drain outlet 211c for removal of the contaminate and water 20 filtered out of the fuel 10 by the filter element 212.

The filter element 212 is preferably a water separation (coalescing) filter that is capable of separating free and emulsified water 20 from the fuel 10 flowing therethrough while also removing other contaminants from the fuel 10. The use of the FCFA 200 is particularly advantageous for fuel storage and supply systems 100 that store ultra-low sulfur diesel (ULSD) fuel and/or ULSD blended with biodiesel fuel products. As discussed above, hydrocarbon utilizing microbes, e.g., "humbugs," may develop in storage tanks, such as USTs, at or near the fuel/water interface. By removing the contaminants and water, not only is the quality of the fuel improved, but the microbe development may be prevented or limited.

Referring again to FIG. 1, an agitation return 220 returns the fuel from the FCFA 200 to the storage tank 110. (The discharge end of the agitation return in the storage tank is considered the outlet for the FCFA.) The agitation return 220 is fluidly connected to the housing outlet 211b of housing 211 and extends to the interior of the storage tank 110. In a preferred embodiment, the agitation return 220 discharges proximate to the bottom of the storage tank 110. Discharge of the fuel 10 in this manner desirably causes turbulence in the fuel 10 near the bottom of the storage tank 110. As noted above, contaminants and/or water 20 tend to collect at or near the bottom of the storage tank 110 because of their density. The turbulence thus causes the contaminants and/or water 20 to be mixed into the bulk of the fuel 10, which may, thereby, be accessible to the pump 131.

In an example embodiment, agitation return 220 may comprise a return tube 221 with a discharge end 222 proximate to a bottom of the storage tank 110. The discharge end 222 of the return tube can also supply an agitator manifold 232 that is elongated across a portion of the bottom of the storage tank 110. As shown, agitator manifold 232 defines a plurality of agitator apertures 233 at least some of which are preferably directed towards the bottom of the storage tank 110. For example, the agitator manifold can be in the form of an elongate tube, a series of parallel tubes, a circle, a rectangle, a plurality of tubes extending from a central point in a "star pattern," or any other suitable configuration, with the agitator apertures 233 being spaced therealong. The returning fuel 10 is thus discharged through the agitator apertures 233 of the agitator manifold 232 causing turbulence near the bottom of the tank 110 across a larger area than simple discharge at the end of return tube 221. This turbulence facilitates mixing of the water 20 and/or debris (contaminants) in the fuel 10. The suspended water 20 and/or debris may then become entrained in the fuel 10 as it is drawn into the pump 131. This enables the water 20 and debris to be actively removed by the FCFA 200, reducing or eliminating the need to remove the storage tank from service in order to remove water and/or debris. Additionally, a separate particle filter can also be added to the fuel flow path, preferably before the filter element 212, in order to extend its service life.

The FCFA 200 includes a fuel flow control valve 230 disposed at any suitable location in the flow path back to the storage tank 110. In this embodiment, valve 230 is located in the flow path of the fuel downstream from the housing outlet 211b. Embodiments are contemplated, however, in which the valve 230 is upstream of the housing inlet 211a (i.e., between port 136 and housing inlet 211a). The fuel flow control valve 230 may be any suitable remotely operated valve, such as a solenoid valve, a servo-actuated valve, a hydraulically actuated valve, or the like. As described in more detail below, the flow control valve 230 may be opened periodically to allow flow through the FCFA 200 and closed to prevent flow through the FCFA 200.

As shown in FIG. 2, processing circuitry (controller) 400 is utilized to control operation of the flow control valve 230 and other aspects of FCFA 200. In this regard, the processing circuitry 400 may provide a signal (or otherwise control power supplied) to the actuator of the flow control valve 230. This will cause the valve 230 to open or close, which will allow or prevent flow of fuel 10 through the FCFA 200. It is anticipated that the processing circuitry 400 may be a standalone unit, or alternatively can be a part of other processors or controllers, such as the ATG 190. For example, the firmware of ATG 190 can be updated to provide the additional functionality described herein.

In the embodiment illustrated, FCFA 200 also includes a flow resistance detector, such as a pressure differential sensor 240, to determine the operational state of filter element 212. In this regard, the filter element 212 may experience a buildup of debris and become inefficient or non-functional while in operation. The buildup of debris and loss of efficiency to the filter element 212 may be indicated by a change in the differential pressure across the filter element 212. The processing circuitry 400 can monitor the pressure differential sensor 240 to determine the need for replacing the filter element 212. For example, the processing circuitry 400 may periodically (such as once per minute, once per second, once per program loop, etc.) compare differential pressure data received from the pressure differential sensor 240 to a predetermined differential pressure. When the processing circuitry 400 determines that the differential pressure deviates from the predetermined differential pressure, the processing circuitry 400 causes a filter service request to be generated and transmitted to the ATG 190 or other remote computing device. Additionally, if the processing circuitry 400 determines that the differential pressure across the filter element 212 exceeds the predetermined differential pressure, the processing circuitry 400 can prevent the flow control valve 230 of the FCFA 200 from opening, therefore preventing flow through the FCFA 200.

A water sensor 250 can also be positioned within the FCFA 200 to determine the presence of water 20 that has been removed by the filter element 212. In one embodiment, the water sensor 250 comprises a conductivity sensor that utilizes a change of state or conductivity, e.g., due to the difference in resistance between the water and fuel, to determine whether water is present. However, any type of suitable water sensor can be used that one skilled in the art will understand can perform the desired function. Preferably, the water sensor 250 would be positioned at a location in relation to filter element 212 where water will collect, such as at the bottom of housing 211.

In the embodiment illustrated, a storage reservoir assembly 300 is used to collect the contaminants and water 20 filtered from the fuel 10 to extend the time between maintenance operations. The storage reservoir assembly 300 includes a storage reservoir 310 that has a storage reservoir inlet 311 in fluid communication with the drain outlet 211c of the housing 211. A reservoir drain valve 320, positioned between the drain outlet 211c of the housing 211 and the storage reservoir inlet 311, controls the flow of contaminants and water 20 into the storage reservoir 310. The reservoir drain valve 320 may be any suitable remotely operated valve, such as a solenoid valve, a servo-actuated valve, a hydraulically actuated valve, or the like. The processing circuitry 400, being also in communication with the water sensor 250, can activate the reservoir drain valve 320 when water 20 in the housing 211 is above the desired level. As a result, fluid in the housing 211 will be caused to flow through the drain outlet 211c and into the storage reservoir 310 through the storage inlet 311. Embodiments are contemplated in which reservoir 310 is integrated with housing 211.

A reservoir level sensor 330 can be used to determine the level of water 20 in the storage reservoir 310, which can then be removed through a drain 312 in the storage reservoir 310. In one embodiment, the reservoir level sensor 330 is a conductivity sensor that utilizes a change of state or conductivity, e.g., due to the difference in resistance to detect the presence of water 20 at a specific level. However, any type of suitable level sensor can be used that one skilled in the art will understand can perform the desired function.

The reservoir level sensor 330 is preferably connected to the processing circuitry 400, which may verify that sufficient volume is available in the storage reservoir 310 prior to causing the drain valve 320 to open. If sufficient volume is available, as indicated by the fluid level (volume) being below a fill threshold, the processing circuitry 400 causes the drain valve 320 to open. If sufficient volume is not available, as indicated by the fluid level being above the fill threshold, the processing circuitry 400 may maintain the drain valve 320 in the closed position despite the indication of presence of water 20 in the housing 211 as indicated by the water sensor 250. When the processing circuitry 400 determines that the fluid level in the storage reservoir 310 is above the fill threshold, the processing circuitry 400 can cause a service request to be generated and transmitted to the ATG 190 or other remote computing device. Additionally, if the processing circuitry 400 determines that the fluid level in the storage reservoir 310 is above the fill threshold, the processing circuitry 400 can prevent the flow control valve 230 of the FCFA 200 from opening, therefore preventing flow through the fuel conditioning and filtration flow path.

In some example embodiments, the processing circuitry 400 can be configured to open the flow control valve 230 and operate the FCFA 200 when the water level sensor 162 reaches a predetermined level. The processing circuitry 400 can also be configured to prevent the operation of the FCFA 200 when the water level sensor 162 indicates a level of water 220 below a predetermined level. Moreover, the processing circuitry 400 may be configured to limit impact on fueling operations, such as allowing the FCFA 200 to be in service when there is low or no dispensing activity in the fuel dispensing environment. For example, the processing circuitry 400 may be configured to place the FCFA 200 in service, by opening flow control valve 230, during times of day that typically have little or no fueling operations (such as 12:00 AM). In one embodiment, the controller 400 thus determines that a current time satisfies a predetermined operation time and causes the flow control valve 230 to open. If the pump 130 is not already activated, it will be caused to activate by processing circuitry 400 in order to force fuel through FCFA 200.

The controller 400 may also operate the FCFA 200 based on predetermined operation criteria, such as pressure in the fuel line 140 and/or the number of active fuel dispensers 150 associated with the storage tank 110. For example, the processing circuitry 400 may receive an indication from the ATG 190 of the number of active fuel dispensers. Moreover, the processing circuitry 400 may receive from the ATG 190 pressure data indicating the pressure measured by the line pressure sensor 141 in the fuel supply line 140.

To facilitate the determination of when to operate FCFA 200, the processing circuitry 400 may include one or more lookup tables defining relevant operation thresholds (e.g., based on the power rating and discharge size of the pump 131 associated with one or more storage tanks 110). For example, Table 1 below provides operation thresholds for Tank Nos. 1-4 in an exemplary fuel dispensing environment, each with a different pump and discharge configuration.

TABLE 1

| Tank # | Pump/Discharge Type | Max. # of Fuel Dispensers | Min. Pressure |
|---|---|---|---|
| 1 | 1.5 HP, 2" Discharge | 4 | 25 psi |
| 2 | 5 HP, 4" Discharge | 10 | 30 psi |
| 3 | 2 × 2 HP, 2" Discharge with IPC | 8 | 25 psi |
| 4 | Generic Pump | 3 | 20 psi |

In this embodiment, the processing circuitry 400 compares the actual pressure data and/or the actual number of active fuel dispensers 150 to their respective operation thresholds defined in the look-up table. If the pressure data is less than the minimum threshold and/or the active number of fuel dispensers 150 is equal to or greater than the maximum, the predetermined operation criteria is not satisfied. In this event, the processing circuitry 400 may then close the flow control valve 230 (or keep it closed). If, however, the pressure data and/or the number of active fuel dispensers 150 satisfies their respective operation criteria (depending on whether or not both criteria are required), the processing circuitry 400 may cause opening of the flow control valve 230. Further, if the flow control valve 230 is open at the time of determination that an operation threshold is not satisfied, the processing circuitry 400 causes the flow control valve 230 to close.

In addition, or in the alternative, the processing circuitry 400 may be configured to place the FCFA 200 in service for a selected duration, such as one hour, two hours, or other suitable time period. In an instance in which the processing circuitry 400 closes the flow control valve 230 prior to the selected duration, such as due to a pressure drop or number of active fuel dispensers 150 exceeding the threshold, the processing circuitry 400 may reopen the flow control valve 230 when the operation criteria is again satisfied to continue the conditioning and filtration process.

At the beginning of operation, the processing circuitry 400 may determine if water is present in the FCFA 200. As discussed above, the processing circuitry 400 may receive conductivity data from the water sensor 250 indicative of the presence or absence of water 20 in the housing 211. In response to the processing circuitry 400 determining an absence of water 20 in the housing 211, the processing circuitry 400 performs conditioning of the fuel 10 by causing the flow control valve 230 to open.

In response to the processing circuitry 400 determining that water 20 is present in the housing 211, the drain valve 320 is caused to open for a sufficient time to allow water 20 in the housing 211 to drain. In an example embodiment, the processing circuitry 400 may then cause the FCFA 200 to be placed back in service for an additional period of time. The process may repeat until the processing circuitry 400 determines an absence of water in the housing 211 or until the end of the selected service duration or until the storage reservoir 310 is full as indicated by level sensor 330.

Example Processing Circuitry

Figure 3:
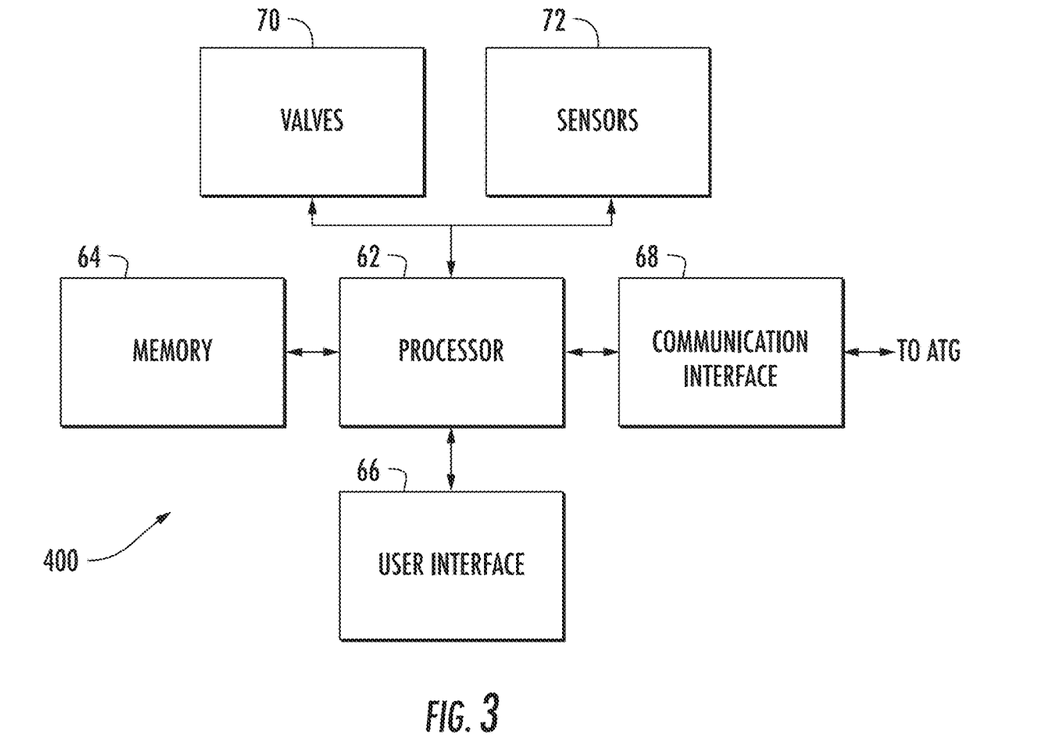
FIG. 3 is a block diagram of one example of processing circuitry according to an example embodiment.

FIG. 3 shows certain elements of processing circuitry 400 in accordance with a preferred embodiment. The processing circuitry 400 may be a self-contained unit as noted above, or may be distributed among a combination of devices. For example, the ATG may be programmed to perform the functions described herein, in which case at least some aspects of processing circuitry 400 may comprise components of the ATG. Furthermore, it should be noted that the devices or elements described below may not be mandatory and thus some may be omitted in certain embodiments.

In an example embodiment, the processing circuitry 400 may include or otherwise be in communication with one or more processors 62 (and associated memory 64). As one skilled in the art will recognize, processor 62 is configured to perform data processing, application execution, and other processing and management services. Processor 62 may be in communication with or otherwise control a user interface 66, a communication interface 68, one or more valves 70, and one or more sensors 72. Processor 62 may be embodied as a circuit chip (e.g., an integrated circuit chip) configured (e.g., with hardware, software or a combination of hardware and software) to perform operations described herein. In some embodiments, however, the processor 62 may be embodied as a portion of a server, computer, or workstation, or distributed among several physical processors.

The user interface 66 may be an input/output device for receiving instructions directly from a user. The user interface 66 may receive user input and/or present output to a user as, for example, audible, visual, mechanical, or other output indications. The user interface 66 may include, for example, a keyboard, a mouse, a joystick, a display (e.g., a touch screen display), a microphone, a speaker, or other input/output mechanisms.

Communication interface 68 may be any suitable means such as a device or circuitry embodied in either hardware, software, or a combination of hardware and software that is configured to receive and/or transmit data from/to a network and/or any other device or module in communication with the processor 62. As such, for example, communication interface 68 may include a communication modem and/or other hardware/software for supporting communication via Ethernet, digital subscriber line (DSL), universal serial bus (USB), or other suitable mechanisms/protocols. In an exemplary embodiment, communication interface 68 may support communication via one or more different communication protocols or methods.

In an example embodiment, the memory 64 may include one or more non-transitory storage or memory devices such as, for example, volatile and/or non-volatile memory that may be either fixed or removable. The memory 64 may be configured to store information, data, applications, instructions or the like for enabling the apparatus to carry out various functions in accordance with example embodiments of the present invention. For example, the memory 64 could be configured to buffer input data for processing by the processor 62. Additionally or alternatively, the memory 64 could be configured to store instructions for execution by the processor 62. As yet another alternative, the memory 64 may include one of a plurality of databases that may store a variety of files, contents, or data sets. Among the contents of the memory 64, applications may be stored for execution by the processor 62 in order to carry out the functionality associated with each respective application.

Processing circuitry 400 may also be in communication with valves, such as flow control valve 230 and drain valve 320 discussed above in reference to FIG. 2. The processing circuitry 400 may cause the valves 70 to open periodically to allow flow or close the valves 70 to prevent flow.

Processing circuitry 400 may also include or be in communication with one or more sensors 72. The sensors 72 may include, without limitation, the line pressure sensor 141, the tank fuel level sensor 161, the tank water level sensor 162, differential pressure sensor 240, water sensor 250, and/or the reservoir level sensor 330, as discussed above in reference to FIG. 2. The sensors 72 may provide sensor data (such as conductivity data, level data, differential pressure data, and/or pressure data) to the processor 62. The processor 62 may utilize the sensor data to determine if one or more conditions or thresholds are satisfied during the conditioning process.

Example Flowchart(s) and Method(s)

Figure 4:
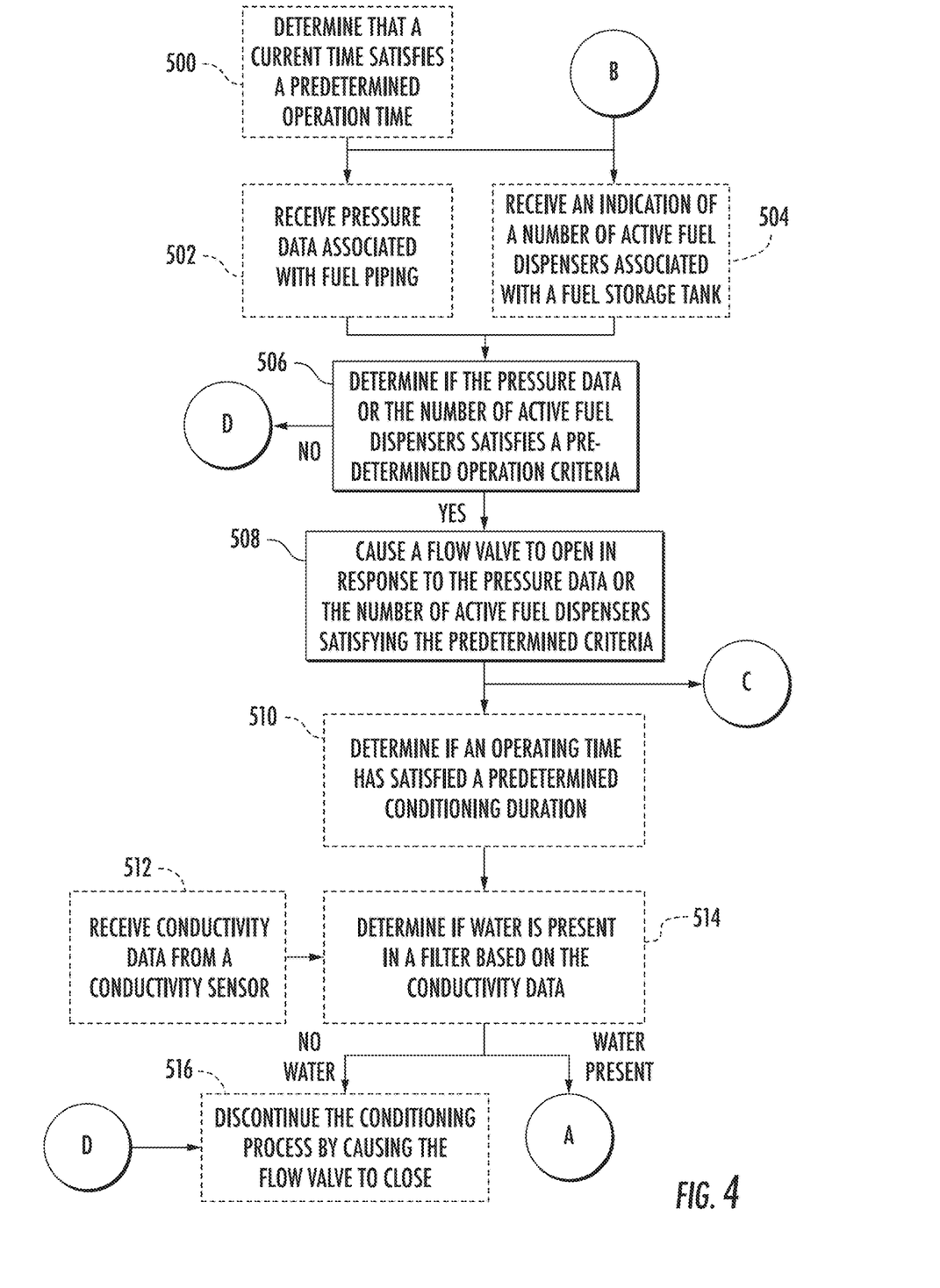
FIGS. 4-6 illustrate example methods for conditioning and filtering fuel according to an example embodiment.
Figure 5:
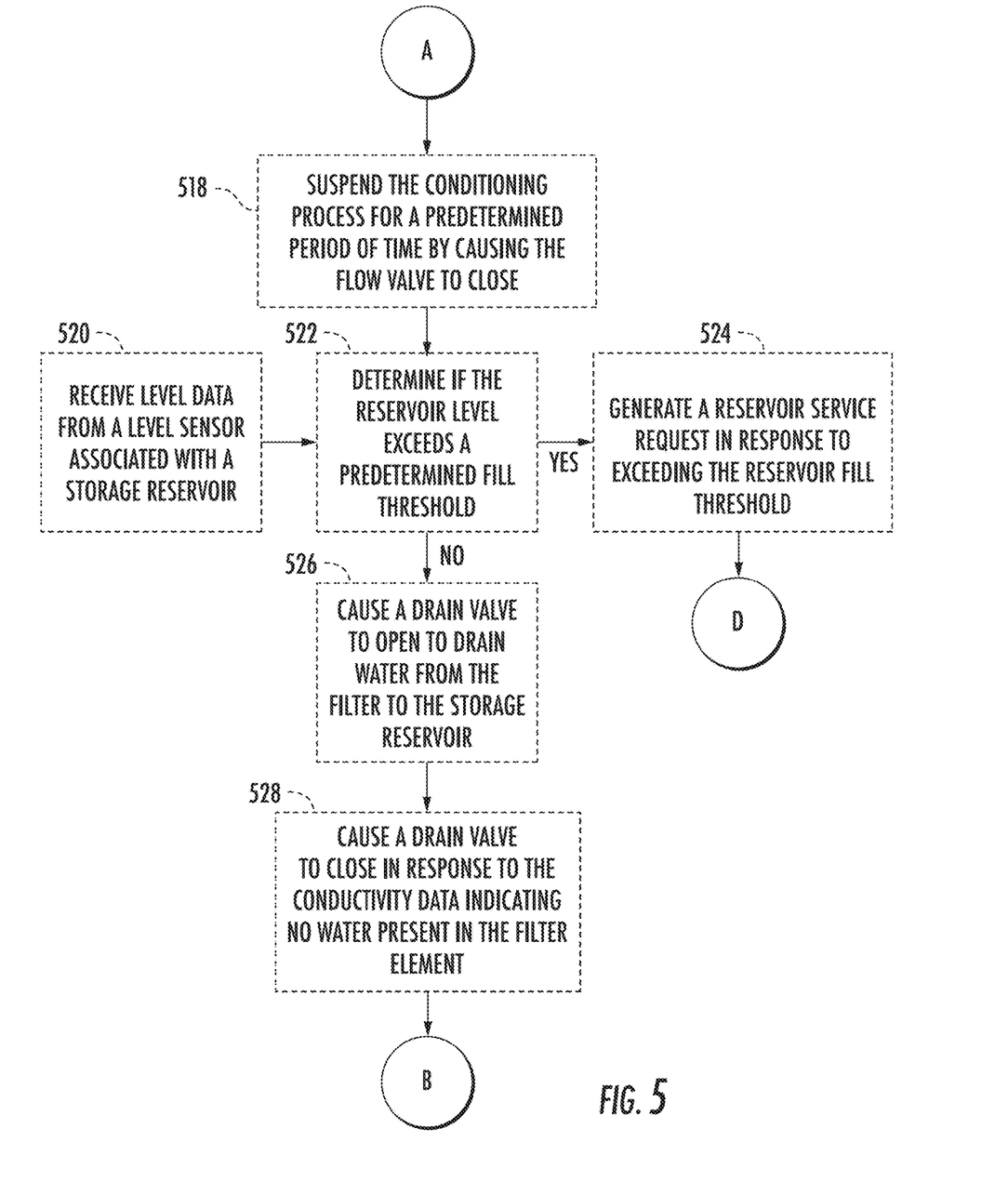
Figure 6:
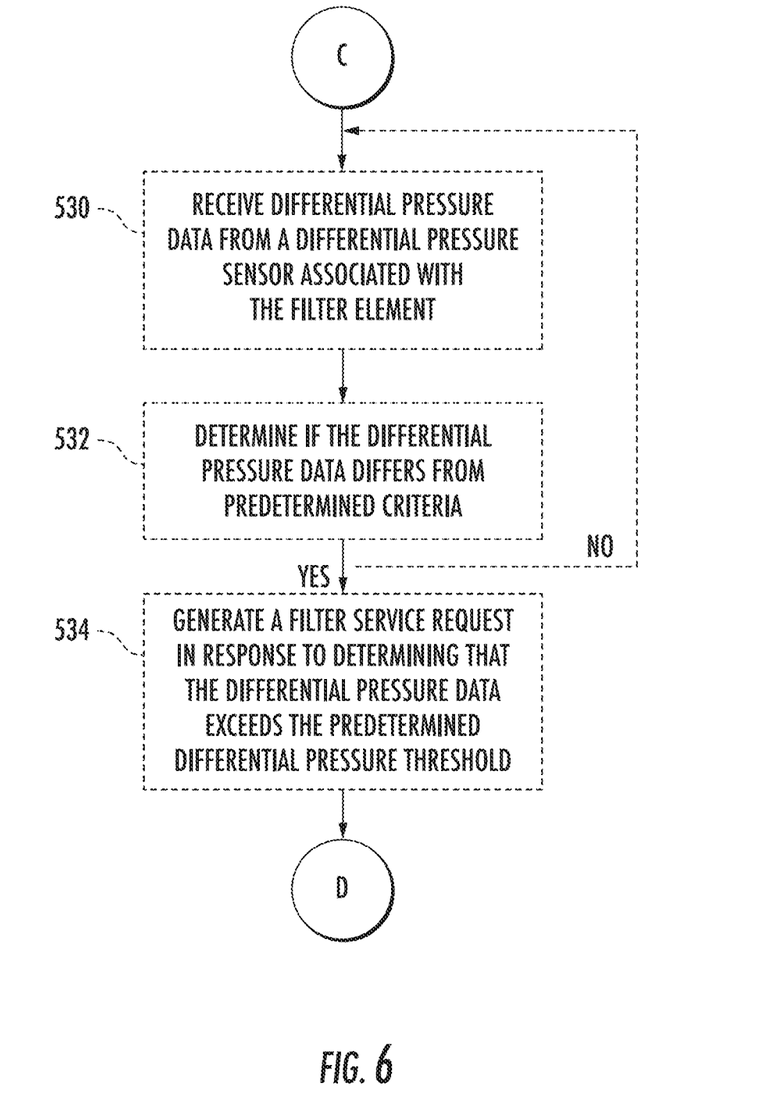

Referring to FIGS. 4-6, methods that may be utilized in accordance with various aspects described herein are illustrated. While, for purposes of simplicity of explanation, the methods are shown and described as a series of acts, it is to be understood and appreciated that the methods are not limited by the order of acts, as some acts may, in accordance with one or more aspects, occur in a different sequence and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with one or more aspects. Some optional steps or operations are indicated, for example, by dashed lines. In other words, embodiments are contemplated in which various steps of the described methodology are not included. For example, some embodiments may rely on satisfying pressure criteria in order to operate without regard to the number of dispensers in use, or vice versa. Other embodiments are contemplated in which the in service time of FCFA 200 is not based on dispensing activity. For example, in cases where a fuel dispensing environment is known to be closed for part of the day, the conditioning and filtration assembly can be operated only during that time.

As indicated at operation 500 (FIG. 4), the method may start with the processing circuitry determining that a current time satisfies a predetermined operation time (e.g., 12:00 AM). Next, the processing circuitry may receive pressure data associated with the fuel piping at operation 502 and/or receive an indication of a number of active fuel dispensers associated with a fuel storage tank at operation 504. The processing circuitry may then determine if the pressure data and/or the number of active fuel dispensers satisfies predetermined operation criteria at operation 506. If the pressure data or the number of active fuel dispensers fails to satisfy the predetermined operation criteria, the processing circuitry may proceed directly to operation 516 by discontinuing the conditioning process (e.g., by closing, or maintaining closed, the FCFA flow control valve). If the pressure data and/or the number of active fuel dispensers satisfies predetermined operation criteria at operation 506, the method may proceed to operation 508.

At operation 508, the processing circuitry may cause the flow valve to open in response to the pressure data and/or the number of active fuel dispensers satisfying the predetermined operation criteria. The processing circuitry may determine if an operating duration has satisfied a predetermined conditioning duration at operation 510. Conductivity data from a conductivity sensor is received as indicated at operation 512. The processing circuitry may determine at operation 514 if water is present in a filter based on the conductivity data. If no water is present, the method proceeds to operation 516, at which the processing circuitry discontinues the conditioning process by causing the flow valve to close. If water is present, the method proceeds to operation 518 of FIG. 5.

At operation 518, the processing circuitry may suspend the conditioning process for a predetermined period of time by closing the flow control valve. The processing circuitry may receive level data from a level sensor associated with a storage reservoir at operation 520 and determine if the reservoir level exceeds a predetermined fill threshold at operation 522. If the level data exceeds the predetermined fill threshold, the processing circuitry may generate a reservoir service request at operation 524 and then proceed to operation 516 (FIG. 4). If the level data does not exceed the predetermined fill threshold, the processing circuitry may cause the drain valve to open to drain water from the filter element to the storage reservoir at operation 526 and cause the drain valve to close in response to the conductivity sensor indicating no water present in the filter at operation 128. The method may repeat by returning to operations 502/504, until the processing circuitry determines that no water is present in the filter element at operation 514.

Turning to FIG. 6, the method may also include monitoring the differential pressure across the filter while the flow valve is open. The processing circuitry may receive differential pressure data from a differential pressure sensor associated with the filter element at operation 530 and determine if the differential pressure data differs from predetermined criteria at operation 532. In response to determining that the differential pressure data differs from predetermined criteria, the processing circuitry may generate a filter service request at operation 534 and proceed to operation 516 (FIG. 4) discontinuing the conditioning process by closing the flow valve.

Figure 7:
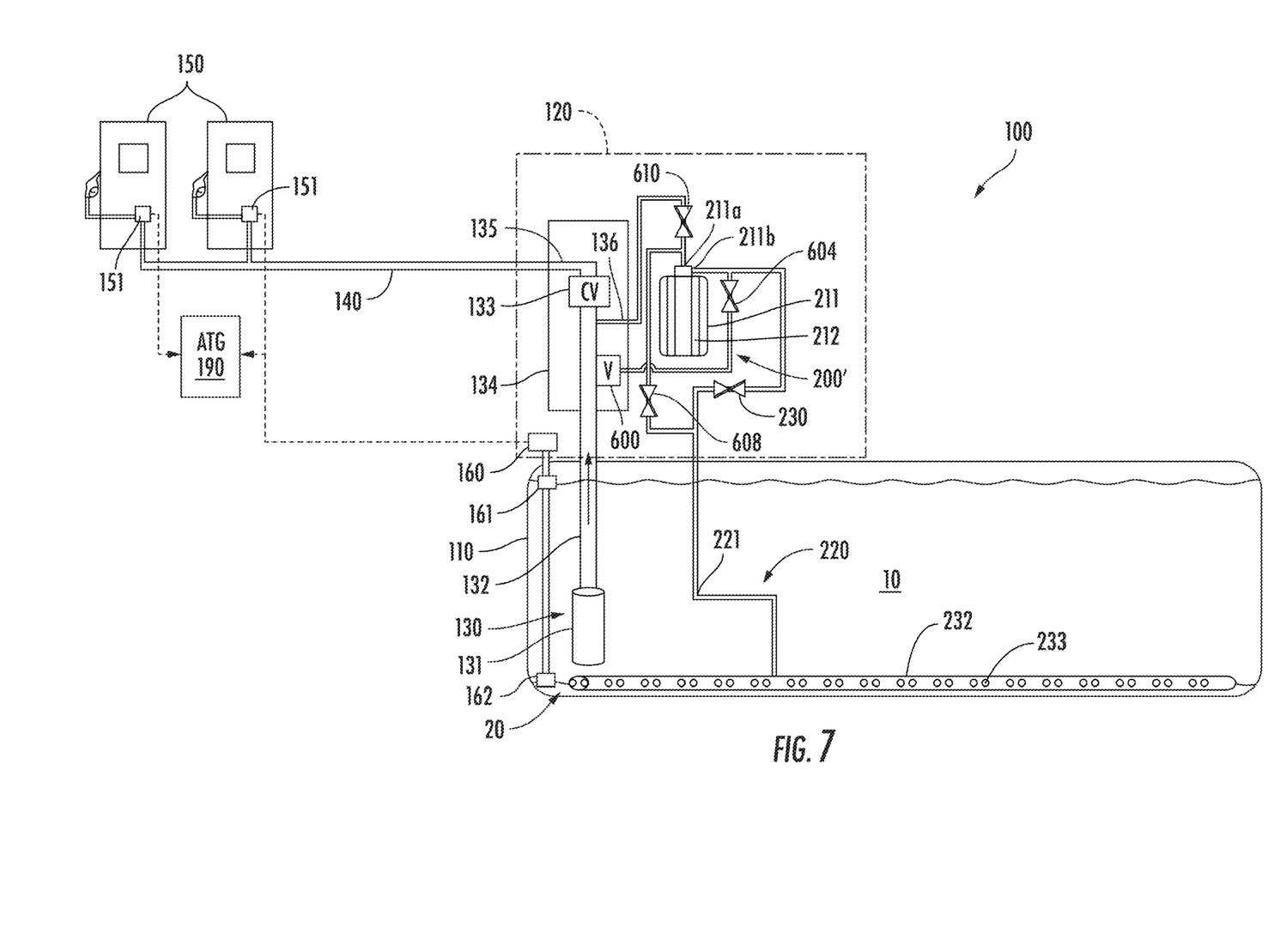
FIG. 7 is a diagrammatic representation of a fuel storage arrangement having a fuel conditioning and filtration assembly in accordance with another embodiment of the present invention.
Figure 8:
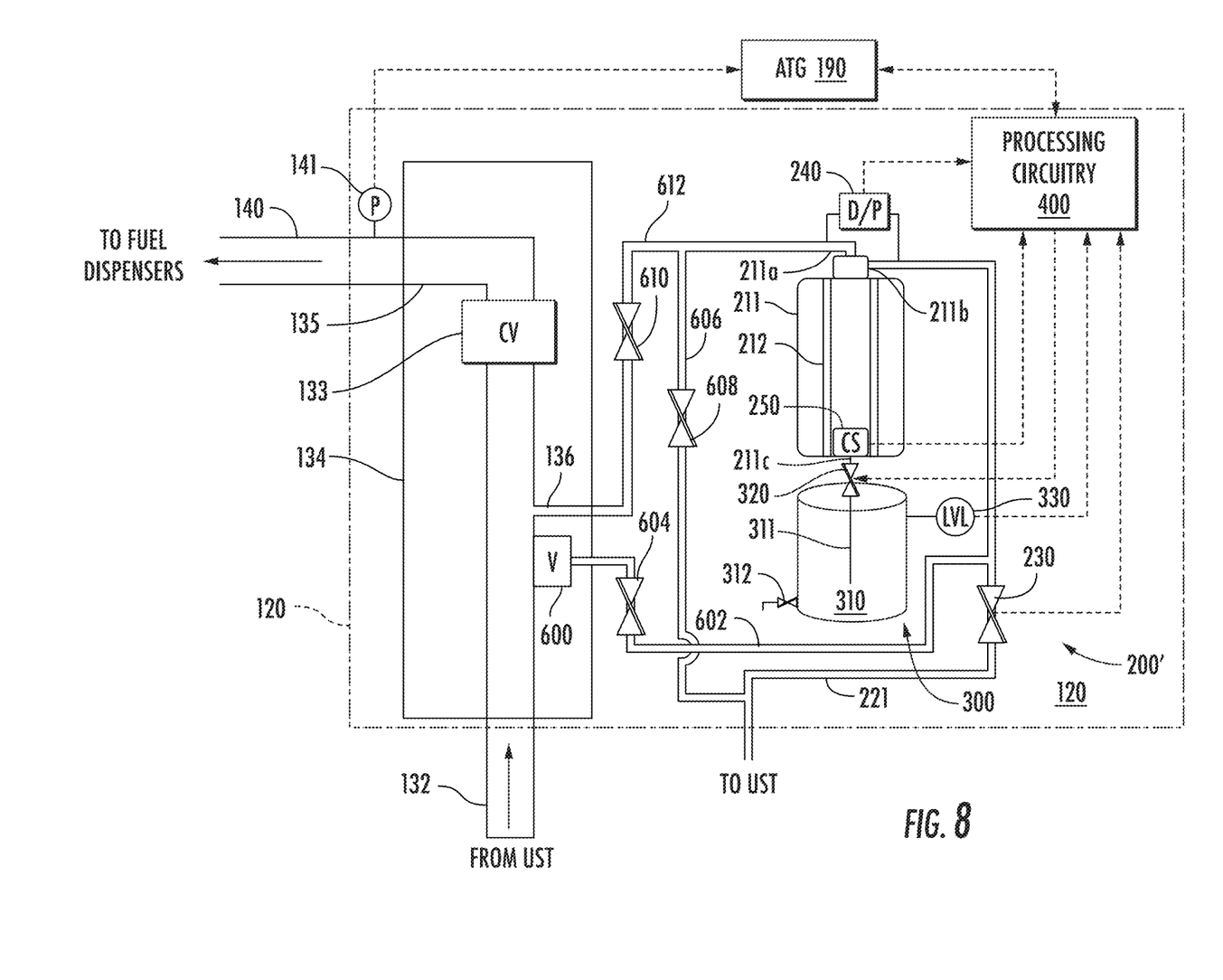
FIG. 8 is a detailed diagrammatic representation of certain aspects of a fuel conditioning and filtration assembly in accordance with another embodiment of the present invention.

FIGS. 7-8 illustrate an alternative FCFA 200' in accordance with another embodiment of the present invention. FCFA 200' is similar in most respects to FCFA 200 described above. Thus, elements of FCFA 200' that correspond to elements of FCFA 200 will be identified by the same reference number. As will now be described, however, FCFA 200' has an additional mode of operation in which vacuum is used to draw water 20 from tank 110 in bulk form which can be captured in storage reservoir 310 for subsequent drainage. The vacuum source utilized for this purpose may be located in the manifold 134 of the pump 130. In this regard, U.S. Pat. No. 8,636,482, incorporated herein by reference in its entirety for all purposes, describes a suitable siphon cartridge that can be used as the vacuum source.

As shown, vacuum source 600 is in fluid communication with return tube 221 at a location upstream of valve 230 via tubing 602. A valve 604 is situated along tubing 602 to selectively connect or disconnect the vacuum source. In addition, tubing 606 provides fluid communication between housing inlet 211a and return tube 221 downstream of valve 230. A valve 608 is located along tubing 606 in order to connect or disconnect the fluid communication provided by tubing 606. In addition, an isolation valve 610 is in this case situated along tubing 612 to provide fluid communication between port 136 and housing inlet 211a. It will be appreciated that valve 610 should be opened when valve 320 is opened to allow drainage of water into reservoir 310 in order to prevent back pressure from impeding the flow.

Like valve 230, valves 604, 608, and 610 may be any suitable remotely operated valve, such as a solenoid valve, a servo-actuated valve, a hydraulically actuated valve, or the like. Also like valve 230, embodiments are contemplated in which one or more of these valves are configured as piloted check valves controlled by a solenoid valve, which is in turn in fluid communication with port 136. As will be appreciated, valves 604, 608, and 610 are in electrical communication with and are controlled by processing circuitry 400.

When it is desired to remove water in bulk from the bottom of tank 110, valves 230 and 610 are closed while valves 604 and 608 are opened. As a result, a vacuum is drawn on the filter outlet 211b of the housing 211. Standing water that has collected at the bottom of the storage tank 110 can thus be pulled into the housing 211 where the water and any fuel in the water is separated. In the illustrated embodiment, the water is pulled into the housing 211 via agitator manifold 232, return tube 221 (downstream of valve 230), and tubing 606. (Alternatively, a separate tube may be installed very close to the bottom of the storage tank 110 for this purpose.) This bulk water collection mode can be run when the STP is running for normal station operation or during station quiet times as determined by the ATG 190 and/or processing circuitry 400.

Removal of the standing water can be determined by processing circuitry 400 using signals from ATG 190 (as indicated by the water float 162), by measuring the rate that water is coming into the filter housing 211 with the use of a sensor in the housing, a flow meter, by the frequency of emptying the water reservoir, or a combination of these options. Once it is determined that the standing water has been removed from the tank 110, FCFA 200' may use a valve (or series of valves) to bleed off the vacuum in the filter housing 211 and then pressurize the filter housing 211 with fuel using the pump 130. At this time, valves 230 and 610 are open with valves 604 and 608 being closed. FCFA 200' will then operate in a conditioning mode substantially to described above in relation to FIGS. 1-6. As needed or periodically as determined by the controller, both bulk water removal and conditioning modes will be used periodically to ensure fuel quality and system efficiency. For example, the bulk water removal mode could be run prior to the conditioning mode each time the conditioning mode is to be commenced. Alternatively, or in addition, the FCFA may switch back and forth between bulk water removal and conditioning modes as necessary or desired.

In some embodiments, the system may be further configured for additional operations or optional modifications. In this regard, in an example embodiment, the pump comprises a submersible turbine pump (STP). In an example embodiment, the fuel condition and filtration flow path receives the fuel under pressure from the fuel supply line. In some example embodiments, the fuel condition and filtration flow path receives the fuel under pressure from the pump. In an example embodiment, the return tube includes an agitator manifold positioned proximate to the bottom of the fuel storage tank, the agitator manifold receiving the fuel from the discharge end of the return tube and having agitation holes directed downward toward the bottom of the storage tank. In some example embodiments, the flow control valve is positioned in the fuel conditioning and filtering flow path downstream from the filter element. In some example embodiments, the flow control valve is positioned in the fuel conditioning and filtration flow path upstream from the filter element. In an example embodiment, the fuel storage and supply arrangement also includes processing circuitry operative to control the flow control valve. In some example embodiments, the filter element is further configured to remove debris from the fuel passing through the filter element.

In an example embodiment, the fuel storage and supply arrangement also includes a differential pressure sensor configured to measure the differential pressure across the filter element indicating the condition of the filter element. In some example embodiments, the differential pressure sensor generates differential pressure data, and further comprises processing circuitry configured to receive differential pressure data from the differential pressure sensor and to generate a filter service request in response to determining that the differential pressure data exceeds a predetermined pressure difference.

In an example embodiment, the filter housing includes a drain for discharging water removed from the fuel by the filter element, and the fuel conditioning and filtration assembly further includes a storage reservoir assembly comprising a storage reservoir and a reservoir valve connecting the storage reservoir with the drain of the housing. In some example embodiments, the fuel conditioning and filtering assembly further includes a water sensor in the housing for the filter element that generates a water signal indicating water in the housing removed from the fuel by the filter element, and processing circuitry receives the water signal and opens the reservoir valve. In an example embodiment, the storage reservoir assembly further includes a reservoir level sensor indicating the level of water in the storage reservoir. In some example embodiments, the reservoir level sensor generates a reservoir level signal indicating a level of water in the reservoir, and processing circuitry receives the reservoir level signal and opens the reservoir valve when the water in the reservoir reaches a predetermined reservoir level.

In some example embodiments, the fuel conditioning and filtration assembly includes a pressure sensor configured to measure the fuel pressure within the fuel piping. In this case, the processing circuitry is configured to receive pressure data from the pressure sensor, determine if the pressure data satisfies predetermined operation criteria, and cause the flow valve to open in response to the pressure data satisfying the predetermined operation criteria. In an example embodiment, the processing circuitry is configured to receive an indication of a number of active fuel dispensers associated with the storage tank, determine if the number of active fuel dispensers satisfies predetermined operation criteria, and cause the flow valve to open in response to the number of active fuel dispensers satisfying the predetermined operation criteria.

It will be appreciated that embodiments of the present invention provide compact and effective fuel conditioning and filtration capability. Various advantages are realized by utilizing the existing fuel pump typically found at the fuel dispensing site. The system can thus be retrofitted into existing retail and fleet fueling sites. The embodiment described in FIGS. 1 and 2 will work with any site fuel pump such as an STP. Communication with the ATG uniquely manages the balance and flow requirements of the pump while also taking into consideration site operating conditions, such as low or no dispensing activity, while also lessening impact to other system test functions, e.g., line leak and tank leak detection.

Many modifications and other embodiments of the invention set forth herein will come to mind to one skilled in the art to which this invention pertains having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a general sense only and not for purposes of limitation.

What is claimed is:

1. A fuel storage and supply arrangement serving as a source of fuel to be dispensed via at least one fuel dispenser in a fuel dispensing environment, comprising:
    a storage tank for containing a quantity of the fuel;
    a pump assembly for drawing the fuel from the storage tank providing the fuel under pressure;
    fuel supply line configured to convey the fuel under pressure from the pump assembly to the at least one fuel dispenser in a dispenser flow path;
    a fuel conditioning and filtration assembly comprising:
        a housing having:
            a housing inlet receiving the fuel under pressure created by the pump; and,
            a housing outlet whereby the fuel entering the housing inlet exits the housing through the housing outlet;
        a filter element within the housing and interposed in the flow path between the housing inlet and the housing outlet, the filter element being configured to remove water from the fuel passing through the filter element;
        a return tube receiving fuel from the outlet of the housing and having a discharge end disposed proximate to a bottom of the storage tank such that fuel flowing through the return tube causes turbulence in the fuel at the bottom of the storage tank;
        wherein the flow of fuel to the housing inlet of the housing and through the discharge end of the return tube defines a fuel conditioning and filtration flow path; and,
    a flow control valve controlling the flow of the fuel along the fuel conditioning and filtration flow path;
    a vacuum source connected for selective fluid communication with the housing outlet of the housing via at least one vacuum control valve; and
    water supply tubing connected for selective fluid communication with the housing inlet of the housing via at least one water supply control valve;
    wherein application of a vacuum to the housing outlet via the at least one vacuum control valve draws water from the bottom of the storage tank into the housing via the water supply tubing when the at least one water supply control valve is open.

2. The fuel storage and supply arrangement of claim 1, wherein the pump assembly comprises a submersible turbine pump (STP).

3. The fuel storage and supply arrangement of claim 1, wherein the fuel conditioning and filtration flow path receives the fuel under pressure from the fuel supply line.

4. The fuel storage and supply arrangement of claim 1, wherein the fuel conditioning and filtration flow path receives the fuel under pressure from the pump assembly.

5. The fuel storage and supply arrangement of claim 1, including an agitator manifold positioned at the discharge end of the return tube proximate to the bottom of the fuel storage tank, said agitator manifold receiving the fuel from the discharge end of the return tube and having agitation holes.

6. The fuel storage and supply arrangement of claim 1, wherein the flow control valve is positioned in the fuel conditioning and filtering flow path downstream from the filter element.

7. The fuel storage and supply arrangement of claim 1, wherein the flow control valve is positioned in the fuel conditioning and filtration flow path upstream from the filter element.

8. The fuel storage and supply arrangement of claim 1, further comprising processing circuitry operative to control the flow control valve.

9. The fuel storage and supply arrangement of claim 1, wherein the filter element is further configured to remove debris from the fuel passing through the filter element.

10. The fuel storage and supply arrangement of claim 1, further comprising a differential pressure sensor configured to measure the differential pressure across the filter element indicating the condition of the filter element.

11. The fuel storage and supply arrangement of claim 10, wherein the differential pressure sensor generates differential pressure data, and further comprising processing circuitry configured to receive the differential pressure data from the differential pressure sensor and to generate a filter service request in response to determining that the differential pressure data exceeds a predetermined pressure difference.

12. The fuel storage and supply arrangement of claim 1, wherein the housing of the fuel conditioning and filtration assembly includes a drain for discharging water removed from the fuel by the filter element, and the fuel conditioning and filtration assembly further includes a storage reservoir assembly comprising a storage reservoir and a reservoir valve connecting the storage reservoir with the drain of the housing.

13. The fuel storage and supply arrangement of claim 12, wherein the fuel conditioning and filtering assembly further includes a water sensor in the housing of the fuel conditioning and filtration assembly that generates a water signal indicating water in the housing removed from the fuel by the filter element, and processing circuitry receives the water signal and opens the reservoir valve when the water in the housing reaches a predetermined water level.

14. The fuel storage and supply arrangement of claim 12, wherein the storage reservoir assembly further includes a reservoir level sensor indicating the level of the water in the storage reservoir.

15. The fuel storage and supply arrangement of claim 14, wherein the reservoir level sensor generates a reservoir level signal indicating a level of the water in the reservoir, and processing circuitry receives the reservoir level signal and opens the reservoir valve when the water in the reservoir reaches a predetermined reservoir level.

16. The fuel storage and supply arrangement of claim 1, wherein the water supply tubing comprises a portion of the return tube.

* * * * *